United States Patent
Raynal et al.

(10) Patent No.: US 10,957,247 B1
(45) Date of Patent: Mar. 23, 2021

(54) DISPLAY WITH SUB-PIXEL DRIVE

(71) Applicant: Rockwell Collins, Inc., Cedar Rapids, IA (US)

(72) Inventors: Francois Raynal, Wilsonville, OR (US); Jeff R. Bader, Aurora, OR (US); Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/387,921

(22) Filed: Apr. 18, 2019

Related U.S. Application Data

(60) Provisional application No. 62/660,802, filed on Apr. 20, 2018.

(51) Int. Cl.
- G09G 5/02 (2006.01)
- G09G 3/3225 (2016.01)
- G06F 3/01 (2006.01)

(52) U.S. Cl.
CPC ........... *G09G 3/3225* (2013.01); *G06F 3/012* (2013.01); *G06F 3/013* (2013.01); *G09G 2320/0626* (2013.01)

(58) Field of Classification Search
CPC .... G09G 3/3225; G09G 3/3233; G06F 3/012; G06F 3/013; G02B 27/017; G02B 27/01
See application file for complete search history.

(56) References Cited

U.S. PATENT DOCUMENTS

| | | | | |
|---|---|---|---|---|
| 10,319,266 B1 * | 6/2019 | Percival | ..................... | G09F 9/33 |
| 10,542,596 B1 * | 1/2020 | Talati | ...................... | G06F 3/147 |
| 2019/0019449 A1 * | 1/2019 | Pappas | ................. | G02B 27/017 |

* cited by examiner

*Primary Examiner* — Vijay Shankar
(74) *Attorney, Agent, or Firm* — Suiter Swantz pc llo

(57) ABSTRACT

A system is disclosed. In one or more embodiments, the system includes a display device including a display substrate configured to display at least one image. In embodiments, the display substrate includes a plurality of pixels, wherein at least one pixel of the plurality of pixels includes a plurality of sub-pixels. The system further includes a sub-pixel drive communicatively coupled to the display substrate. In embodiments, the sub-pixel drive is configured to generate one or more control signals configured to selectively modify a sub-pixel luminance level of at least one sub-pixel of the plurality of sub-pixels in order to adjust one or more characteristics of the display substrate.

14 Claims, 10 Drawing Sheets

DISPLAY WITH SUB-PIXEL DRIVE

CROSS-REFERENCE TO RELATED APPLICATION

The present application claims the benefit under 35 U.S.C. § 119(e) of U.S. Provisional Application Ser. No. 62/660,802, filed Apr. 20, 2018, entitled DISPLAY WITH IMPROVED PERFORMANCE THROUGH SUB-PIXEL DRIVE, naming Francois Raynal, Jeff R. Bader, and Christopher Alan Keith as inventors, which is incorporated herein by reference in the entirety.

BACKGROUND

Pixelated displays require varying levels of brightness in different ambient lighting conditions. For example, a display may require higher brightness levels during daytime operations (e.g., high ambient light conditions) to maintain sufficient image quality for a user. Conversely, a pixelated display may be required to produce lower brightness levels during night-time operations (e.g., low ambient light conditions) to both maintain a sufficient image quality for a user and so as not to adversely affect a viewer's night vision.

Currently, the lighting efficiency of displays (e.g., pixelated displays) has been improving by increasing the brightness per unit power or current. However, display devices have a minimum current requirement to achieve a minimum brightness operational state. This minimum brightness operational state makes it difficult to achieve the low-end brightness levels (e.g., dim brightness levels) which are required for night-time operations (e.g., low ambient light conditions). Furthermore, the low-end brightness levels are no longer achievable because the brighter, more efficient displays are unstable at low currents, resulting in poor image qualities or the display not turning on at low currents.

The low performance levels and unstable nature of displays at low current levels (e.g., low brightness levels) results in displays having to be operated at higher brightness levels. These higher brightness levels have been found to be incompatible with night-time operations, as the contrast between the high-brightness display and the low ambient light surroundings negatively affect a user's night vision and/or the user's ability to see the real-world. Furthermore, dimming the display for night operations is not feasible, as the displays exhibit low image quality and instability at low brightness levels. In the field of avionics, the highest quality video image is of utmost importance when conducting night-time operations (e.g., low ambient light conditions). Accordingly, the inability of emissive pixelated displays to operate efficiently in low-ambient light conditions render them ill-suited for use in many aircraft settings.

Additionally, for some types of emissive pixelated displays, the displays are generally not as efficient/bright as transmissive displays. In order to compensate for lower luminance efficiency, pixelated emissive displays are designed with a high fill factor, such that as much of the emissive display surface as possible is active, and the photometrically inactive area of each pixel is kept to a minimum. While high fill factors may be associated with improved efficiency/brightness, high fill factors also result in lower Modulation Transfer Function (MTF) values (e.g., contrast modulation), thereby reducing image quality.

Therefore, there exists a need for a system and method which cure one or more of the shortcomings identified above.

SUMMARY

A system is disclosed. In one or more embodiments, the system includes a display device including a display substrate configured to display at least one image. In embodiments, the display substrate includes a plurality of pixels, wherein at least one pixel of the plurality of pixels includes a plurality of sub-pixels. The system further includes a sub-pixel drive communicatively coupled to the display substrate. In embodiments, the sub-pixel drive is configured to generate one or more control signals configured to selectively modify a sub-pixel luminance level of at least one sub-pixel of the plurality of sub-pixels in order to adjust one or more characteristics of the display substrate.

In some embodiments of the system, generating one or more control signals configured to selectively modify a sub-pixel luminance level of the at least one sub-pixel includes generating one or more control signals configured to selectively actuate the at least one sub-pixel between an inactive state and an active state.

In some embodiments of the system, the one or more characteristics of the display substrate comprises at least one of a display substrate luminance level or a display substrate modulation transfer function (MTF) value.

In some embodiments of the system, the system further includes one or more light sensors configured to collect ambient light readings.

In some embodiments of the system, generating one or more control signals configured to selectively modify one or more characteristics of the at least one sub-pixel includes generating one or more control signals configured to selectively modify a sub-pixel luminance level of the at least one pixel between an active state and an inactive state in response to a collected ambient light reading.

In some embodiments of the system, generating one or more control signals configured to selectively modify a sub-pixel luminance level of the at least one pixel between an active state and an inactive state in response to a collected ambient light reading includes: generating one or more control signals configured to selectively actuate the at least one sub-pixel from an active state to an inactive state in response to a collected ambient light reading below an ambient light threshold value; and generating one or more control signals configured to selectively actuate the at least one sub-pixel from an inactive state to an active state in response to a collected ambient light reading above the ambient light threshold value.

In some embodiments of the system, the plurality of sub-pixels comprise one or more spectrum-altered sub-pixels.

In some embodiments of the system, the at least one pixel of the plurality of pixels comprises a first sub-pixel and an additional sub-pixel.

In some embodiments of the system, the first sub-pixel is configured to emit light including infrared (IR) light wavelengths, wherein the additional sub-pixel is configured to emit light which does not include infrared (IR) wavelengths.

In some embodiments of the system, the sub-pixel drive is configured to generate one or more control signals configured to selectively actuate the first sub-pixel from an active state to an inactive state when an ambient light reading collected by one or more light sensors is below an ambient light threshold value.

In some embodiments of the system, the sub-pixel drive is further configured to: generate a first set of one or more control signals configured to selectively modify a sub-pixel luminance level of the first sub-pixel; and generate an additional set of one or more control signals configured to selectively modify a sub-pixel luminance level of the additional sub-pixel.

In some embodiments of the system, the first set of one or more control signals is transmitted over a first time interval and the additional set of one or more control signals is transmitted over an additional timer interval, wherein the additional time interval is different from the first time interval.

In some embodiments of the system, the first set of one or more control signals includes a first electric current intensity profile, and the additional set of one or more control signals include an additional electric current intensity profile, wherein the first electric current intensity profile is different from the additional electric current intensity profile.

In some embodiments of the system, the display device comprises at least one of a head-up display (HUD), a head-mounted display (HMD), or an aircraft cockpit display.

In one or more additional embodiments of the present disclosure, a system is disclosed. In embodiments, the system includes a display device including a display substrate configured to display at least one image. The display substrate may include a plurality of pixels, wherein at least one pixel of the plurality of pixels includes a plurality of sub-pixels. In embodiments, the system further includes one or more light sensors configured to collect one or more ambient light readings. In embodiments, the system further includes a sub-pixel drive communicatively coupled to the display substrate and the one or more light sensors, the sub-pixel drive configured to: generate one or more control signals configured to selectively modify a sub-pixel luminance level of at least one sub-pixel of the plurality of sub-pixels from a first sub-pixel luminance level to an additional sub-pixel luminance level different than the first sub-pixel luminance level based on the one or more collected ambient light readings. In some embodiments, modifying the sub-pixel luminance level of the at least one sub-pixel from the first sub-pixel luminance level to a second sub-pixel luminance level lower than the first sub-pixel luminance level decreases a luminance level of the display substrate and increases a modulation transfer function (MTF) value of the display substrate. In additional embodiments, modifying the sub-pixel luminance level of the at least one sub-pixel from the first sub-pixel luminance level to a third sub-pixel luminance level higher than the first sub-pixel luminance level increases a luminance level of the display substrate and decreases a modulation transfer function (MTF) value of the display substrate.

In some embodiments of the system, wherein generating one or more control signals configured to selectively modify a sub-pixel luminance level of at least one sub-pixel comprises: generating one or more control signals configured to selectively actuate the at least one sub-pixel between an inactive state and an active state.

In some embodiments of the system, generating one or more control signals configured to selectively modify a sub-pixel luminance level of at least one sub-pixel of the plurality of sub-pixels from a first sub-pixel luminance level to an additional sub-pixel luminance level different than the first sub-pixel luminance level based on the one or more collected ambient light readings comprises: generating one or more control signals configured to selectively actuate the at least one sub-pixel from an active state to an inactive state when the one or more collected ambient light readings are below an ambient light threshold value, and generating one or more control signals configured to selectively actuate the at least one sub-pixel from an inactive state to an active when the one or more ambient light readings are above the ambient light threshold value.

In one or more additional embodiments of the present disclosure, a method is disclosed. In some embodiments, the method includes displaying one or more images on a display substrate of a display device, the display substrate including a plurality of pixels including one or more sub-pixels; receiving one or more ambient light readings from one or more light sensors; generating one or more control signals configured to selectively modify a sub-pixel luminance level of at least one sub-pixel of the one or more sub-pixels in response to the received one or more ambient light readings; and adjusting the sub-pixel luminance level of the at least one sub-pixel of the plurality of sub-pixels in response to the one or more control signals.

In some embodiments of the method, generating one or more control signals generating one or more control signals configured to selectively modify a sub-pixel luminance level of at least one sub-pixel of the one or more sub-pixels includes: generating, at a first time, a first set of one or more control signals configured to selectively modify a sub-pixel luminance level of a first sub-pixel of the one or more sub-pixels; and generating, at an additional time different from the first time, an additional set of one or more control signals configured to selectively modify a sub-pixel luminance level of an additional sub-pixel of the one or more sub-pixels.

In some embodiments of the method, generating one or more control signals generating one or more control signals configured to selectively modify a sub-pixel luminance level of at least one sub-pixel of the one or more sub-pixels includes: generating a first set of one or more control signals configured to selectively modify a sub-pixel luminance level of a first sub-pixel of the one or more sub-pixels; and generating an additional set of one or more control signals configured to selectively modify a sub-pixel luminance level of an additional sub-pixel of the one or more sub-pixels, wherein the first set of one or more control signals include a first electric current intensity profile and the additional set of one or more control signals include an additional electric current intensity profile different from the first electric current intensity profile.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4A illustrates a pixelated display system incorporated in a head mounted display (HMD), in accordance with one or more embodiments of the present disclosure.

FIG. 4B illustrates a pixelated display system incorporated in a head mounted display (HMD), in accordance with one or more embodiments of the present disclosure.

DETAILED DESCRIPTION

Figure 1:
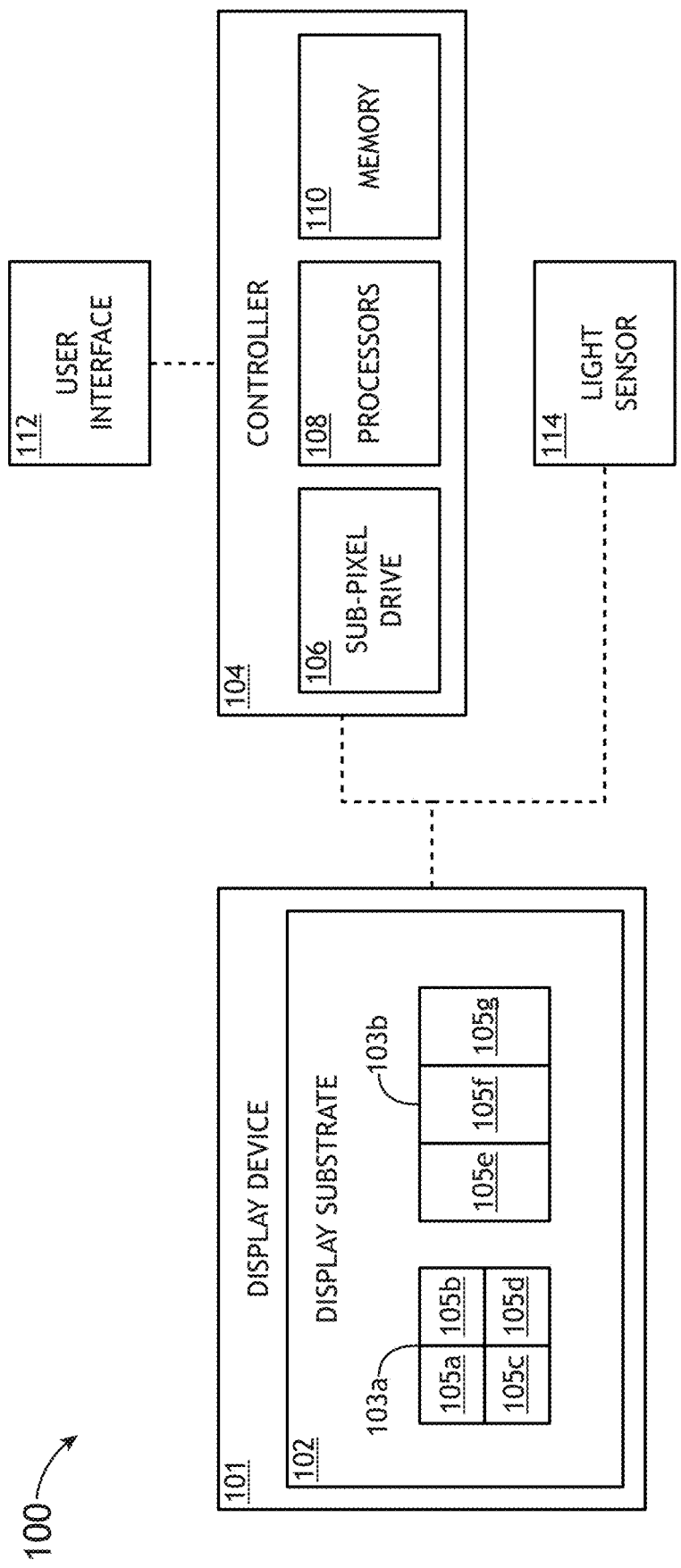
FIG. 1 illustrates a block diagram of a pixelated display system with a sub-pixel drive, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

As noted previously herein, pixelated displays require varying levels of brightness in different ambient lighting conditions. By way of example, a display may require higher brightness levels during daytime operations (e.g., high ambient light conditions) to maintain sufficient image quality for a user. By way of example, when flying during day operations, a pilot may experience 10,000 fL ambient conditions. In these high ambient light conditions, the pilot's helmet mounted display (HMD) as well as the aircraft's head-up displays (HUD) must maintain a brightness and contrast high enough to make the displays visible. Therefore, a high luminance efficiency is essential during day time operations.

Conversely, a pixelated display may be required to produce lower brightness levels during night-time operations (e.g., low ambient light conditions) to both maintain a sufficient image quality for a user and so as not to adversely affect a viewer's night vision or view of the real-world. It has been found that the contrast between high brightness displays and the low ambient light surroundings during night time operations negatively affect a viewer's night vision or view of the real-world. Therefore, in order to allow pilots to maintain eyesight adapted for night vision and situational awareness of the real-world scene during night time operations, displays with low brightness levels are required.

Taken together, pixelated displays which are capable of maintaining high brightness levels for high ambient light conditions, low brightness levels for low ambient light conditions, and high contrast levels in all ambient light conditions are required. In particular, such pixelated displays are required in aviation, where eyesight and visibility are of utmost importance.

It is noted herein that emissive pixelated displays (such as OLEDs) provide demonstrably superior performance in areas such as contrast and veiling glare as compared to back light transmission Liquid Crystal Displays (LCDs). The quality of the image displayed on a display substrate of an emissive pixelated display is a function of the structure and density of the pixels within the display substrate. Additionally, the density of the active area of each pixel contributes to the overall image quality of the display. Furthermore, the superior performance of emissive pixelated displays may be attributed, in part, due to the fact that there is no light leakage in the dark state of an emissive pixelated display. This provides for a more pleasing augmented reality display, which may be used in a wide variety of applications including, but not limited to, vehicle navigation displays, aircraft navigation displays (e.g., cockpit displays), head-mounted displays (HMDs), head-up displays (HUDs), and the like.

Emissive pixelated displays, however, are often less efficient at high brightness levels (e.g., not as bright) as compared to other displays, such as some LCDs (e.g., LED-backlit LCD displays). For example, with some LCD displays, the entire display may be illuminated with LED light. Conversely, OLED displays may only illuminate and draw power for the pixels which are in an active state (e.g., "turned on"). In this regard, some LED displays may draw more power than some OLED display counterparts. To compensate for the lower luminance efficiency, emissive pixelated displays are designed so that as much of the emissive display surface as possible is active. Accordingly, the "fill factor" of the pixels are maximized, and the photometrically inactive areas of the pixels are minimized.

The fill factor of a pixel describes the ratio of light sensitive area against the total area of the pixel. Accordingly, the fill factor in a pixelated display is inversely related to the image quality of the pixelated display (e.g., the quality of an image shown on a display substrate of the pixelated display). The Modulation Transfer Function (MTF) refers to the contrast modulation of a display and is a measure of image quality. The lower the fill factor, the higher the MTF (e.g., contrast modulation). Conversely, the higher the fill factor, the lower the MTF. However, the need/desire for low fill factor (high MTF) and/or high fill factor (low MTF) display substrate values in varying ambient light conditions must be compared against the desire with brightness (luminance) requirements in the varying ambient light conditions. Thus, the challenge with pixelated displays is that a high fill factor may be desirable in high ambient light conditions, whereas a low fill factor may be desirable in low ambient light conditions. The relationship between fill factor and MTF is described in further detail herein with reference to FIGS. 2A and 2B.

Some pixelated displays typically have poorer MTF values (e.g., lower quality images) due to the need for a high fill factor. In order to calculate MTF, a set of bar targets are measured and the contrast between the dark bars and the bright bars is used to calculate MTF. The greater the modulation contrast, the greater the image quality and resolution of the video imagery.

Additionally, traditional emissive displays such as OLEDs provide the maximum number of distinguishable luminance levels, also known as shades of gray, when the display is at maximum luminance (e.g., high brightness). In general, OLEDs may provide a maximum of 256 shades of gray at high luminance levels. At lower luminance levels, however, the number of distinct luminance levels is diminished and, consequently, the quality and resolution of the image being display is diminished.

Accordingly, embodiments of the present disclosure are directed at curing one or more of the shortfalls of previous approaches identified above. Embodiments of the present disclosure are directed to a pixelated display system including a sub-pixel drive. Additional embodiments of the present disclosure are directed to the use of a sub-pixel drive configured to selectively modify sub-pixel luminance levels of a display substrate in order to improve the image quality of an image displayed on the display substrate. Additional embodiments of the present disclosure are directed to selectively modifying sub-pixel luminance levels in response to collected ambient light readings. Additional embodiments of the present disclosure are directed at the use of a sub-pixel drive to selectively modify sub-pixel luminance levels of sub-pixels including spectrum filtered sub-pixels. Further embodiments of the present disclosure are directed to a sub-pixel drive configured to carry out sub-pixel Pulse-Width Modulation (PWM). It is contemplated herein that selectively modifying sub-pixel luminance levels may be used to improve a number of performance characteristics of a pixelated display including, but not limited to, image quality, contrast, image resolution, display brightness, and the like.

Referring generally to FIGS. 1-7, a pixelated display system including a sub-pixel drive is described, in accordance with one or more embodiments of the present disclosure.

FIG. 1 illustrates a block diagram of a pixelated display system 100 with a sub-pixel drive 106, in accordance with one or more embodiments of the present disclosure. The system 100 may include, but is not limited to, a display device 101, a display substrate 102, a controller 104, a sub-pixel drive 106, one or more processors 108, and a memory 110. In embodiments, the system 100 may further include a user interface 112 and one or more light sensors 114.

The display device 101 may include any display device including a display substrate 102 known in the art. For example, in embodiments, the display device 101 may include, but is not limited to, a head-up display (HUD), a head-mounted display (HMD) a vehicle-mounted display (e.g., aircraft cockpit display, automobile display), a mobile device display (e.g., smart phone display, handheld display, smart watch display, and the like). In this regard, while much of the present disclosure is directed to a system 100 in the context of an aircraft environment (e.g., aircraft cockpit display, HUD, HMD, and the like), it is contemplated herein that embodiments of the present disclosure may be applied to display devices 101 in contexts other than aircraft environments.

In embodiments, the display substrate 102 includes a pixelated display substrate such that the display substrate includes a plurality of pixels 103. It is contemplated herein that the display substrate 102 may include any pixelated substrate known in the art including, but not limited to, emissive pixelated display substrates (e.g., OLEDs), transmissive pixelated display substrates (e.g., LCDs), reflective pixelated display substrates (e.g., DLPs), and the like. For example, as shown in FIG. 1, the display substrate 102 may include a first pixel 103a and a second pixel 103b. In embodiments, at least one pixel 103 of the plurality of pixels 103 includes a plurality of sub-pixels 105. For example, as shown in FIG. 1, pixel 103a may include a first sub-pixel 105a, a second sub-pixel 105b, a third sub-pixel 105c, and a fourth sub-pixel 105d. Similarly, the sub-pixel 103b may include a first sub-pixel 105e, a second sub-pixel 105f, and a third sub-pixel 105g. It is noted herein that display substrate 102 may include any number of pixels 103, and that the pixels 103 shown are not to be regarded as limiting, but provided solely for illustration. Similarly, it is noted that each pixel 103 of the plurality of pixels 103a-103n (referred to generally as "plurality of pixels 103") may include any number of sub-pixels 105, and that the sub-pixels 105a-105g shown are not to be regarded as limiting, but provided solely for illustration.

In embodiments, the display device 101 and/or the display substrate 102 may be communicatively coupled to a controller 104. The display device 101 and the display substrate 102 may be communicatively coupled to the controller 104 using any wireline or wireless communication technique known in the art. The controller 104 may include a sub-pixel drive 106, one or more processors 108, and memory 110. System 100 may further include a user interface 112 communicatively coupled to the controller 104, wherein the user interface 112 is configured to display information of system 100 to a user and/or receive one or more input commands from a user configured to adjust one or more characteristics of system 100.

In additional embodiments, the system 100 may include one or more light sensors 114. The one or more light sensors 114 may include any light sensors 114 known in the art including, but not limited to, ambient light sensors. For example, the one or more light sensors may include at least one of a photoresistor, a photodiode, a phototransistor, a photocell, a photovoltaic light sensor, a photo diode, a light-dependent sensor, and the like. The one or more light sensors 114 may be configured to collect ambient light readings associated with the environment of system 100. For example, in the context of an aircraft, the one or more light sensors 114 may be configured to collect ambient light readings within the cockpit of the aircraft, wherein the ambient light readings are indicative of the amount of ambient light experienced by the pilot of the aircraft at a particular point in time. In this regard, continuing with the same example, the one or more light sensors 114 may collect high ambient light readings during the day, and low ambient light readings at night.

The one or more processors 108 and/or the sub-pixel drive 106 may be configured to execute the set of program instructions stored in memory 110, the set of program instructions configured to cause the one or more processors 108 and/or sub-pixel drive 106 to carry out one or more steps of the present disclosure. In this regard, when it is stated that the sub-pixel drive 106 carries out a particular function, this may be regarded as the sub-pixel drive 106 causing the one or more processors 108 to carry out the particular function. In an additional and/or alternative embodiment, sub-pixel drive 106 may include one or more dedicated processors and/or control circuitry configured to cause the sub-pixel drive 106 to carry out the steps of the present disclosure. In yet an additional and/or alternative embodiment, the sub-pixel drive 106 may take the form of a module, which may be executed by the one or more processors 108.

In one embodiment, the sub-pixel drive 106 may be configured to selectively modify one or more characteristics of at least one sub-pixel 105 of the display substrate. In embodiments, the sub-pixel drive 106 may be configured to generate one or more control signals configured to selectively modify a sub-pixel 105 luminance level of at least one sub-pixel 105. For example, the sub-pixel drive 106 may be configured to generate one or more control signals configured to selectively actuate one or more sub-pixels 105 between an inactive state and an active state (e.g., from an inactive state to an active state, from an active state to an inactive state). The sub-pixel drive 106 may be configured to selectively modify a sub-pixel luminance level of one or more pixels in order to adjust one or more characteristics of the display substrate 102. As has been noted previously herein, proper manipulation of sub-pixels 105 may be used to improve a number of performance characteristics of the display substrate 102 including, but not limited to, image quality, contrast, image resolution, luminance level (e.g., brightness), and the like.

It is noted herein that the inclusion of sub-pixel drive 106 in a pixelated display system 100 may provide numerous advantages to image and video quality of the display substrate 102 of system 100. By selectively actuating one or more sub-pixels 105 between an inactive state and an active state, the sub-pixel drive 106 may be configured adjust the pixel fill factor of one or more pixels 103 of the display substrate 102. As noted previously herein, pixel fill factor is inversely related to the Modulation Transfer Function (MTF) (a metric of image quality) of a display substrate 102, such that decreasing pixel fill factor increased the MTF value of a display substrate. In this regard, by selectively actuating one or more sub-pixels 105 between an inactive state and an active state, the sub-pixel drive 106 may be configured to selectively adjust the pixel fill factor of the display substrate 102, and therefore selectively adjust the MTF value (and image quality) of the display substrate 102.

In one embodiment, sub-pixel drive 106 may improve the resolution (e.g., image quality) of display substrate 102 of pixelated display system 100 by improving the Modulation Transfer Function (MTF) value of the display substrate 102. Accordingly, sub-pixel drive 106 may increase the contrast between Nyquist images of the display substrate 102. It is noted herein that increasing the MTF of a display substrate 102 may result in higher contrast and image quality of the display substrate 102. In this regard, sub-pixel drive 106 may be configured to selectively modify a sub-pixel luminance level of one or more sub-pixels 105 in order to increase a contrast level of the display substrate 102, thereby increasing the total number distinguishable light levels (e.g., shades of gray) which may be displayed on display substrate 102. By increasing the number of shades of gray, the sub-pixel drive 106 may optimize the number of distinct luminance levels in a monochrome display, and therefore improve the quality of the images shown on display substrate 102. These improvements may be carried out in both low ambient light and high ambient light conditions. The greater the number of total distinguishable light levels which may be shown on a display, the greater the image quality. As such, a sub-pixel drive 106 may dither sub-pixels 105 to allow pixelated display system 100 to produce low luminance, night vision-compatible images (e.g., low brightness) during low ambient light conditions (e.g., "night mode").

It is noted herein that improving the image quality of a display carries with it many advantages. This is especially the case in the avionics industry. When operating in low ambient light conditions (e.g., at night), pixelated displays typically show video images of the surrounding environment in grayscale. Display systems which include a sub-pixel drive 106 may increase the total number of distinguishable shades of gray that the display substrate 102 may produce at low luminance levels (e.g., low ambient light conditions), thereby improving the image quality.

In embodiments, the sub-pixel drive 106 may be configured to selectively modify a sub-pixel luminance level of at least one sub-pixel 105 based on one or more ambient light readings collected by the one or more light sensors 114. As noted previously herein, for optimal performance, a display substrate 102 may be operated at high display substrate 102 luminance levels during high ambient light conditions (e.g., daytime), and may further be operated at low display substrate 102 luminance levels during low ambient light conditions (e.g., at night). In this regard, the sub-pixel drive 106 may be configured to adjust a total luminance level of the display substrate 102 ("display substrate luminance level") in response to one or more collected ambient light readings by selectively modifying a sub-pixel luminance level of one or more sub-pixels 105.

For example, at night, the one or more light sensors 114 may collect ambient light readings indicating low ambient light conditions (e.g., low ambient light readings). The sub-pixel drive 106 may then be configured to generate one or more control signals configured to selectively adjust a sub-pixel luminance level one or more sub-pixels 105 in response to the low ambient light reading. By way of another example, during the daytime, the one or more light sensors 114 may collect ambient light readings indicating high ambient light conditions (e.g., high ambient light readings). The sub-pixel drive 106 may then be configured to generate one or more control signals configured to selectively adjust a sub-pixel luminance level one or more sub-pixels 105 in response to the low ambient light reading.

In embodiments, the sub-pixel drive 106 may be configured to selectively modify sub-pixel luminance levels depending on a comparison of collected ambient light readings to ambient light threshold values. For example, ambient light readings above an ambient light threshold value may be associated with a "day time mode" with a high display substrate luminance level, and ambient light readings below the ambient light threshold value may be associated with a "night time mode" with a low display substrate luminance level. For instance, the sub-pixel drive 106 may be configured to selectively actuate one or more sub-pixels 105 from an active state to an inactive state in response to a collected ambient light reading below an ambient light threshold value, and may further be configured to selectively actuate the one or more sub-pixels 105 from an active state to an inactive state in response to a collected ambient light reading above the ambient light threshold value.

In embodiments, the sub-pixel drive 106 may be configured to actuate sub-pixels 105 from an inactive state to an active state to increase the brightness of the display substrate 102 to a full brightness level sufficient for day time operations. By way of example, the sub-pixel drive 106 may actuate sub-pixels 105 between an inactive state and an active state in order to achieve high luminance levels which may provide ample contrast against 10,000 fL ambient light surroundings. In other embodiments, the sub-pixel drive 106 may be configured to actuate sub-pixels 105 from an active state to an inactive state to decrease the brightness of the display substrate 102 to a full brightness level sufficient for day time operations. As such, a sub-pixel drive 106 may allow a pixelated display system 100 to produce low luminance, night vision-compatible images (e.g., low brightness) during low ambient light conditions (e.g., "night mode") by selectively actuating sub-pixels 105 between an active state and an inactive state.

As noted previously herein, one drawback of pixelated displays is that some pixelated devices (e.g., emissive pixelated displays) often have a minimum current requirement to achieve a minimum brightness operational state. This minimum brightness operational state makes it difficult to achieve the low-end display substrate 102 luminance levels (e.g., dim brightness levels) which are required for night-time operations (e.g., low ambient light conditions).

In one embodiment, sub-pixel drive 106 may allow for low display substrate 102 luminance levels even at higher currents. For example, the sub-pixel drive 106 may be configured to selectively actuate one or more sub-pixels 105 of a pixel 103 from an active state to an inactive state, while simultaneously applying high currents to remaining sub-pixels 105 of the pixel 103. In effect, this allows the sub-pixel drive 106 to reduce the overall luminance level of the pixel 103 (and thereby reduce the overall display substrate 102 luminance level) while maintaining a high current provided to the remaining sub-pixels 105 in the active state. In this regard, the sub-pixel drive 106 may decrease the overall luminance level of the display substrate 102 such that the display substrate 102 of system 100 is suitable for night time operations, while also producing a current which is sufficient to maintain the operational stability of the display substrate 102. For instance, as shown in FIG. 1, sub-pixel drive 106 may selectively turn off sub-pixels 105a, 105b, and 105c of pixel 103a. By turning off sub-pixels 105a, 105b, and 105c (e.g., actuating to an inactive state) the sub-pixel drive 106 may effectively cut off the current provided to sub-pixels 105a, 105b, and 105c, but not alter the current provided to sub-pixel 105d. In so doing, the sub-pixel drive 106 may reduce the overall luminance level (e.g., brightness) of the pixel 103a and display substrate 102 while maintaining a high current level provided to sub-pixel 105d to maintain operational stability. Accordingly, the remaining sub-pixels 105 in an active state may avoid the instability issues of traditional displays, as the remaining active sub-pixels 105 (e.g., sub-pixel 105d) may be provided a sufficient current so as to maintain a minimum current requirement to achieve a minimum brightness operational state.

Applicant notes that turning off (e.g., selectively actuating to an inactive state) one or more sub-pixels 105 within a pixel 103 may also produce finer lines and details (e.g., symbology) of images displayed on display substrate 102. The finer lines and details may lead to a higher quality image displayed on display substrate 102. For conditions such as a night aircraft carrier landing, thinner lines, details, and symbols displayed on display substrate 102 may allow for less veiling glare issues and allow symbols to appear dimmer and sharper, which may improve the pilot's night vision and ability to view the real-world scene. Furthermore, it is noted that selectively actuating one or more sub-pixels 105 from an active state to an inactive state via sub-pixel drive 106 to improve sight during night time operations does not adversely affect the ability of display substrate 102 of system 100 to provide high brightness lines, details, and symbols that can be seen by the pilot in high ambient light conditions.

It is noted herein that the one or more components of system 100 may be communicatively coupled to the various other components of system 100 in any manner known in the art. For example, the display substrate 102, the controller 104, the sub-pixel drive 106, the one or more processors 108, the memory 110, the user interface 112, and/or the one or more light sensors 114 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth, 3G, 4G, 4G LTE, 5G, and the like).

In one embodiment, the one or more processors 108 may include any one or more processing elements known in the art. In this sense, the one or more processors 108 may include any microprocessor-type device configured to execute software algorithms and/or instructions. In one embodiment, the one or more processors 108 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from memory 110. Moreover, different subsystems of the system 100 (e.g., sub-pixel drive 106, light sensors 114, user interface 112) may include one or more processor or logic elements suitable for carrying out at least a portion of the steps described throughout the present disclosure. Therefore, the above description should not be interpreted as a limitation on the present disclosure but merely an illustration.

The memory 110 may include any storage medium known in the art suitable for storing program instructions executable by the associated one or more processors 108. For example, the memory 110 may include a non-transitory memory medium. For instance, the memory 110 may include, but is not limited to, a read-only memory (ROM), a random access memory (RAM), a magnetic or optical memory device (e.g., disk), a magnetic tape, a solid state drive and the like. It is further noted that memory 110 may be housed in a common controller housing with the one or more processors 108. In an alternative embodiment, the memory 110 may be located remotely with respect to the physical location of the processors 108, sub-pixel drive 106, and controller 104. In another embodiment, the memory 110 maintains program instructions for causing the one or more processors 108 to carry out the various steps described through the present disclosure.

In another embodiment, the controller 104 is coupled to a user interface 112. In another embodiment, the user interface includes a display. In another embodiment, the user interface includes the user input device. For example, the display device may be coupled to the user input device by a transmission medium that may include wireline and/or wireless portions. The display device of the user interface 112 may include any display device known in the art. The display device of the user interface 112 may include the display device 101 or additional and/or alternative display devices. For example, the display device may include, but is not limited to, a liquid crystal display (LCD), an organic light-emitting diode (OLED) based display, a CRT display, and the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with a user input device (e.g., touchscreen, bezel mounted interface, keyboard, mouse, trackpad, and the like) is suitable for implementation in the present invention.

The user input device of the user interface 112 may include any user input device known in the art. For example, the user input device may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Attendant advantages of the sub-pixel drive 106 of the present disclosure may be further illustrated with reference to FIGS. 2A and 2B.

Figure 2A:
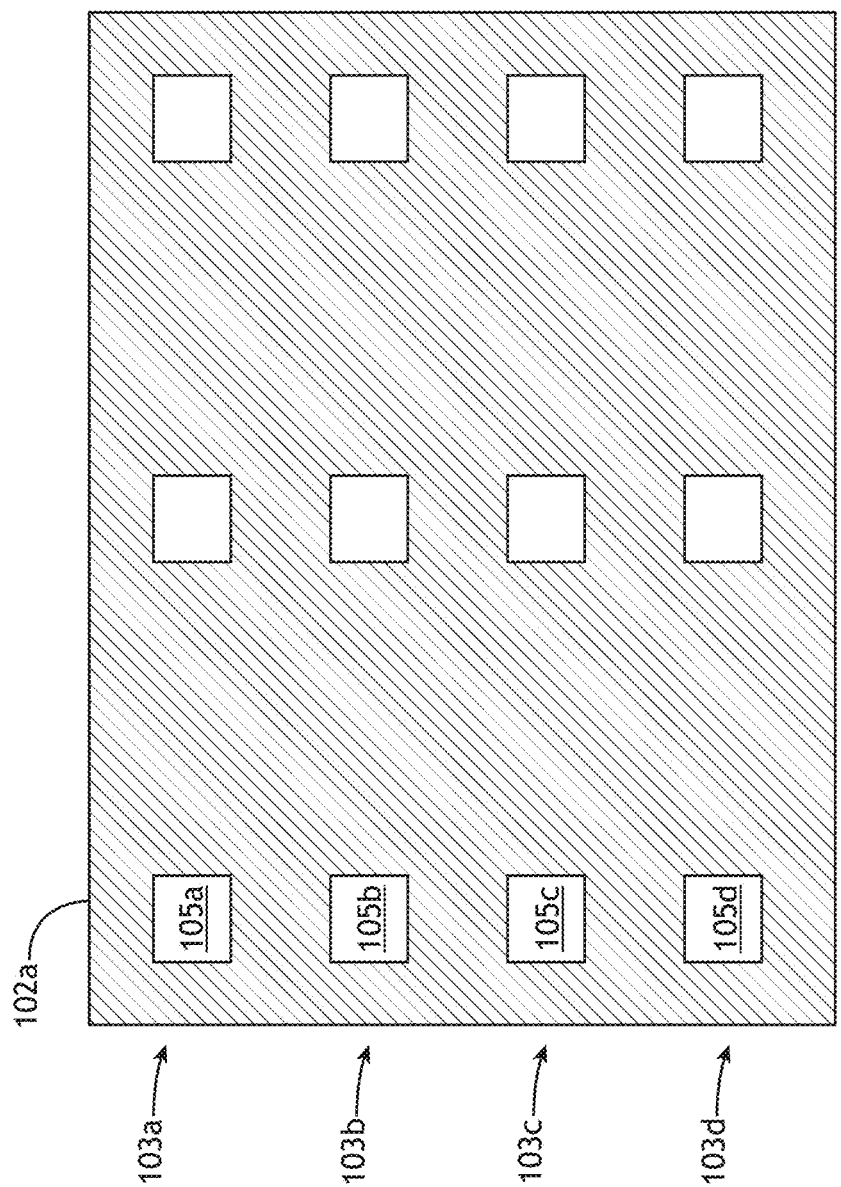
FIG. 2A illustrates a pixelated display substrate with a low fill factor.

FIG. 2A illustrates a pixelated display substrate with a low fill factor. FIG. 2B illustrates a pixelated display substrate with a high fill factor, in accordance with one or more embodiments of the present disclosure. As can be seen with reference to FIGS. 2A and 2B, the contrast between a bright pixel and its adjacent dark pixel depends on the amount of dark space between the bright areas.

Figure 2B:
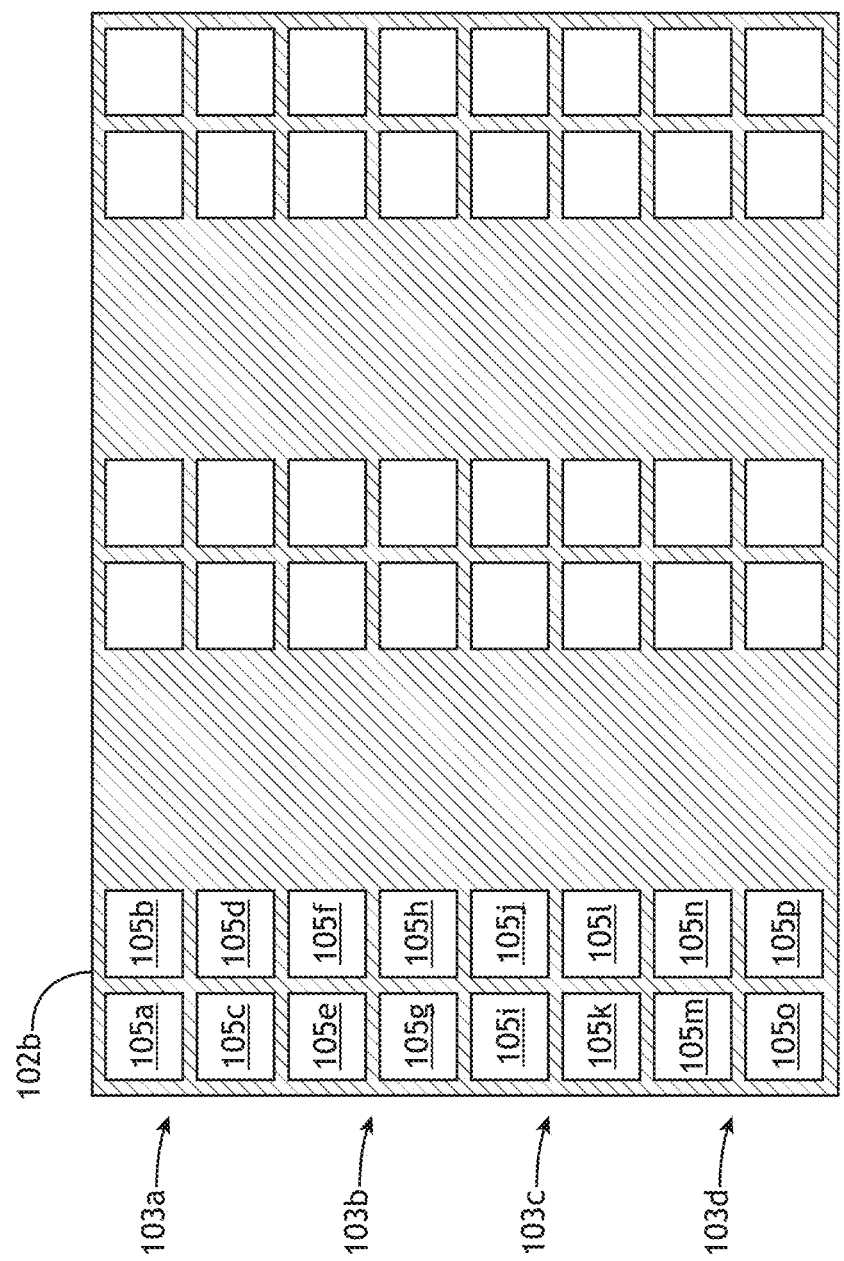
FIG. 2B illustrates a pixelated display substrate with a high fill factor, in accordance with one or more embodiments of the present disclosure.

A comparison of display substrates 102a and 102b depicted in FIGS. 2A and 2B illustrates the difference between a pixelated display with a low fill factor (FIG. 2A) and a pixelated display with a high fill factor (FIG. 2B). As noted previously herein, the fill factor is a metric indicative of the proportion of a pixel 103 and/or display substrate 102 which is optically active. For example, as shown in FIG. 2A, a display substrate 102a with a plurality of pixels 103a-103d may include a plurality of sub-pixels 105a-105d which do not substantially fill each pixel 103a-103d (e.g., exhibit a low fill factor). Conversely, as shown in FIG. 2B, a display substrate 102b with a plurality of pixels 103a-103d may each include a plurality of sub-pixels 105a-105p which substantially fill each pixel 103a-103d (e.g., exhibit a low fill factor).

The Modulation Transfer Function (MTF) performance of a display substrate is inversely proportional to the fill factor, wherein decreasing the fill factor increases the MTF, and increasing the fill factor decreases MTF. In this regard, two display substrates with the same pixel 103 size but with different fill factors may produce very different image qualities. Turning off sub-pixels 105 in an image source effectively decreases the fill factor of the display substrate 102, and therefore improves the MTF of the display substrate 102. As noted previously, the fill factor in an pixelated display is inversely related to the image quality of the pixelated display.

In embodiments, sub-pixel drive 106 may selectively actuate sub-pixels 105 between an active state and an inactive state in order to selectively modify the fill factor (and therefore the MTF) of the display substrate. The sub-pixel drive 106 may further selectively actuate sub-pixels 105 in order to carry out anti-aliasing of images displayed on display substrate 102. Fine detailed images displayed on pixelated displays (e.g., display substrate 102) have jagged edges and discontinuities. By distributing an image over several pixels and sub-pixels, an image may be smoothed out over several frames, thereby improving the quality of the image. In this regard, sub-pixel drive 106 may carry out anti-aliasing algorithms which selectively manipulate/actuate one or more sub-pixels 105, which distribute an image displayed on display substrate 102 over several pixels 103, thereby smoothing out the image over several frames.

Figure 3A:
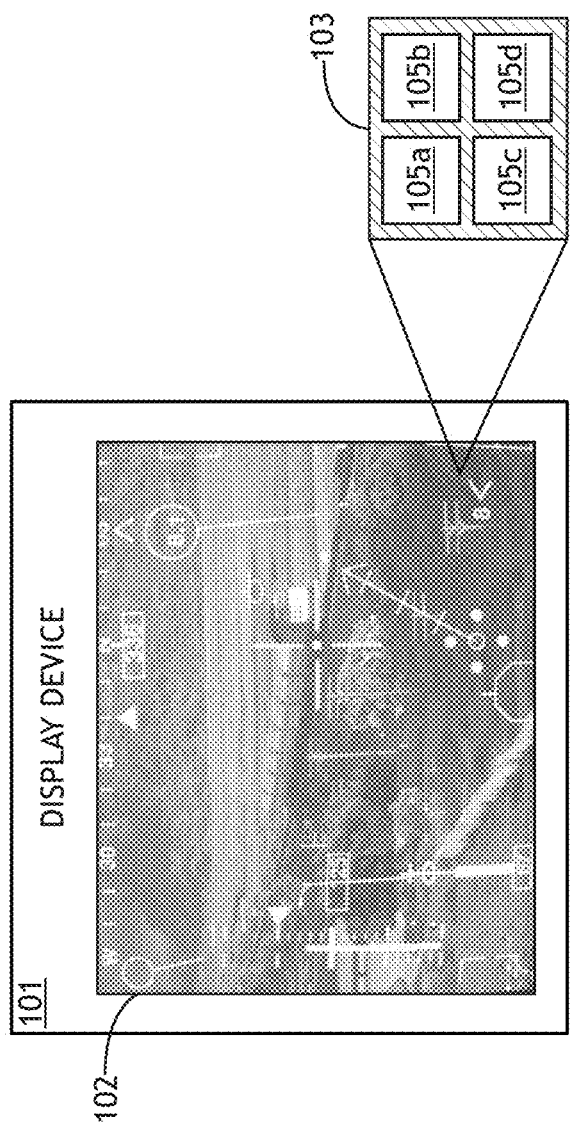
FIG. 3A illustrates a display device including a display substrate with sub-pixels of each pixel in an active state, in accordance with one or more embodiments of the present disclosure.

FIG. 3A illustrates a display device 101 including a display substrate 102 with sub-pixels 105 of each pixel 103 in an active state, in accordance with one or more embodiments of the present disclosure. More particularly, FIG. 3A illustrates a display substrate 102 generating one or more images (e.g., symbols, numbers, letters, and the like) overlaid over a real-world scene. In this regard, the train and surrounding landscape environment shown in FIG. 3A is a real-world scene viewed by a viewer (e.g., pilot), whereas the symbology overlaid on top of the real-world scene are generated by the display substrate 102.

As noted previously herein, the display device 101 may include any display device known in the art including, but not limited to, a vehicle navigation display, an aircraft navigation display (e.g., cockpit display), a head-mounted display (HMDs), a head-up display (HUDs), and the like. As noted previously herein, the sub-pixel drive 106 may be configured to selectively modify a sub-pixel 105 luminance level in order to adjust a luminance level of the display substrate 102. Additionally, the sub-pixel drive 106 may be configured to adjust sub-pixel luminance levels (and therefore display substrate 102 luminance levels) in order to maintain a high display substrate 102 luminance level (e.g., high brightness) during daytime and high ambient light conditions. In this regard, as shown in FIG. 3A, the sub-pixel drive 106 may be configured to actuate each sub-pixel 105 of a display substrate 102 to an active state in order to maintain a high display substrate 102 luminance level during high ambient light conditions (e.g., daytime conditions). This may provide for optimal luminance and contrast efficiency during high ambient light conditions.

Figure 3B:
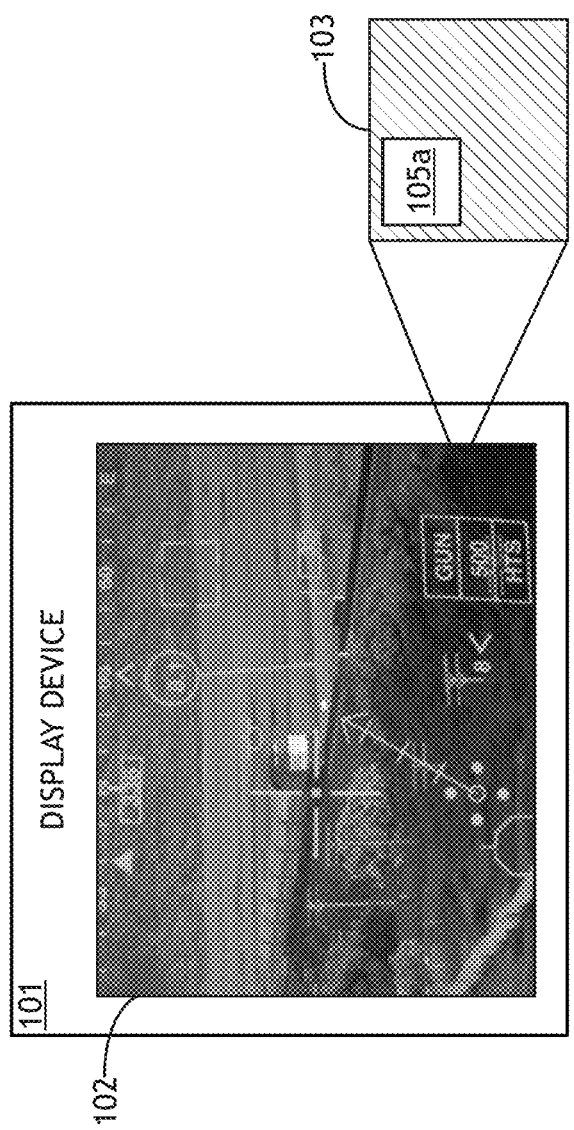
FIG. 3B illustrates a display device including a display substrate with one or more sub-pixels of each pixel in an inactive active state, in accordance with one or more embodiments of the present disclosure.

FIG. 3B illustrates a display device 101 including a display substrate 102 with one or more sub-pixels 105 of each pixel 103 in an inactive active state, in accordance with one or more embodiments of the present disclosure. More particularly, FIG. 3B illustrates a display substrate 102 generating one or more images (e.g., symbols, numbers, letters, and the like) overlaid over a real-world scene. In this regard, the train and surrounding landscape environment shown in FIG. 3B is a real-world scene viewed by a viewer (e.g., pilot), whereas the symbology overlaid on top of the real-world scene are generated by the display substrate 102.

In embodiments, the sub-pixel drive 106 may be configured to selectively modify a sub-pixel 105 luminance level of one or more sub-pixels 105 in order to decrease the luminance level of the display substrate 102 during low ambient light conditions. For example, as shown in FIG. 3B, the sub-pixel drive 106 may be configured to actuate one or more sub-pixels 105 of one or more pixels 103 to an inactive state in order to reduce the display substrate 102 luminance level during low ambient light conditions (e.g., nighttime conditions). This may provide for optimal image quality by reducing glare and preventing interference with the pilot's ability to view the real-world scene.

Figure 4A:
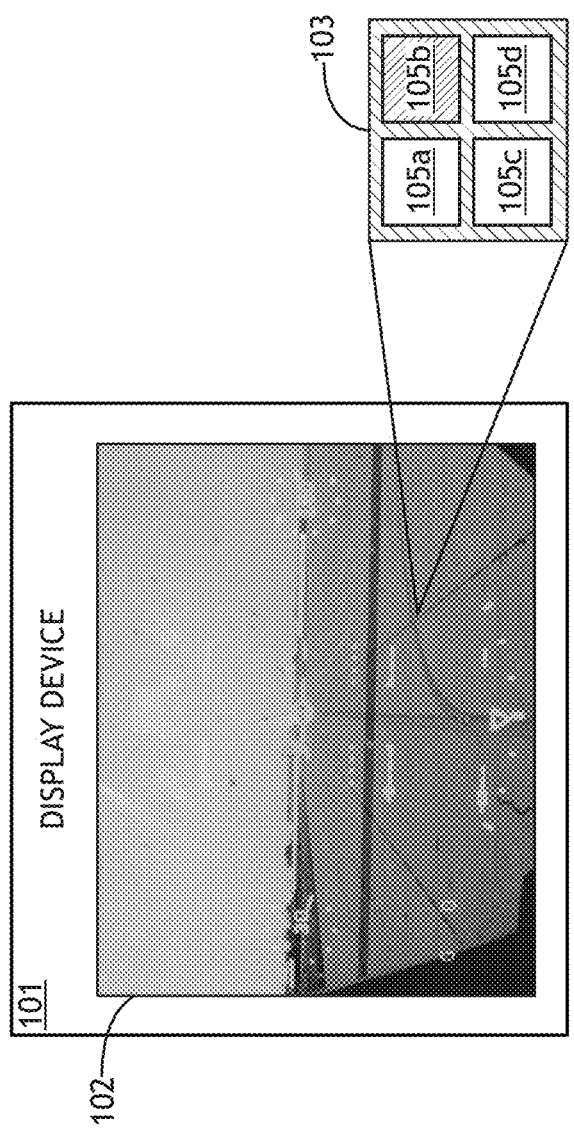
FIG. 4A illustrates a display device including a display substrate with pixels including one or more spectrum-altered sub-pixels, in accordance with one or more embodiments of the present disclosure.
Figure 4B:
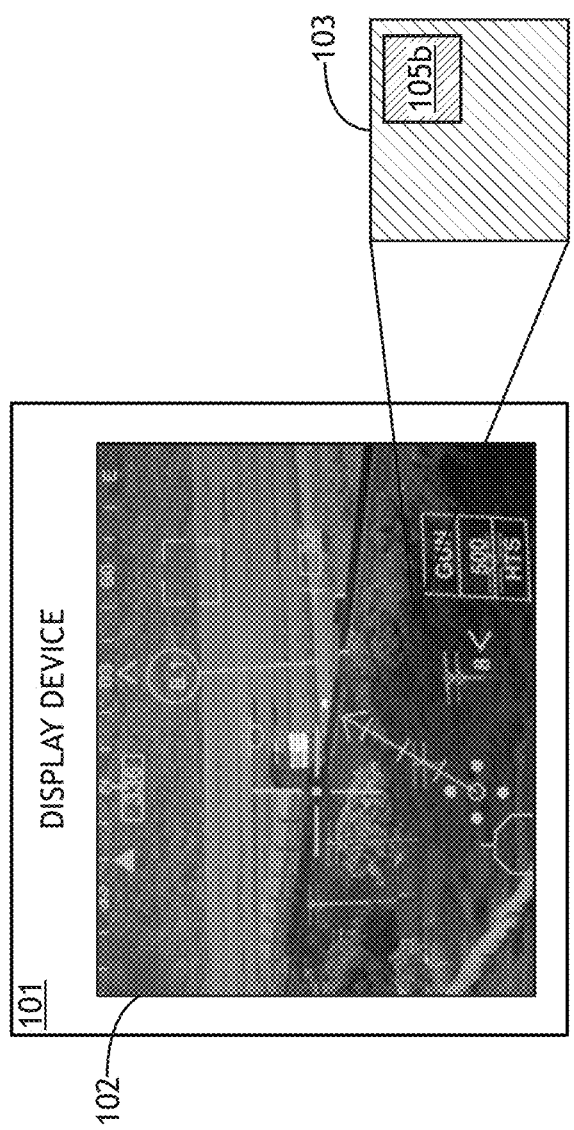
FIG. 4B illustrates a display device including a display substrate with pixels including one or more spectrum-altered sub-pixels, in accordance with one or more embodiments of the present disclosure.

FIGS. 4A-4B illustrate a display device 101 including a display substrate 102 with one or more spectrum-altered sub-pixels 105, in accordance with one or more embodiments of the present disclosure. As noted previously with respect to FIGS. 3A-3B, FIGS. 4A-4B illustrate a display substrate 102 generating one or more images (e.g., symbols, numbers, letters, and the like) overlaid over a real-world scene. In this regard, the runway, train, and surrounding landscape environments are real-world scene viewed by a viewer (e.g., pilot), whereas the symbology overlaid on top of the real-world scene are generated by the display substrate 102.

In embodiments, system 100 may be configured to provide a night-vision compatible display. In some embodiments, system 100 may include one or more pixels which include one or more spectrum-altered sub-pixels 105. As it is used herein, the term "spectrum-altered" sub-pixels 105 may be regarded as referring to sub-pixels 105 which exhibit one or more different spectral characteristics, as compared to other sub-pixels 105. The one or more different spectral characteristics of the one or more spectrum-altered sub-pixels 105 may be achieved using any technique known in the art including, but not limited to, filtering. For example, as shown in FIGS. 4A-4B, sub-pixel 105b of pixel 103 may include a spectrum-altered sub-pixel 105b. In embodiments, one or more pixels 103 of the display substrate 102 may include one or more spectrum-altered sub-pixels 105. A spectrum-altered sub-pixel 105b may include any sub-pixel 105 known in the art which is configured to exclude (e.g., filter, block, or not emit) one or more wavelengths of light.

For example, the sub-pixel 105b may include a spectrum-altered sub-pixel 105b which has been filtered such that the sub-pixel 105b does not emit light in the infrared (IR) or near-infrared (NIR) spectrums. It is contemplated herein that including one or more spectrum-altered sub-pixels 105 which do not emit IR and/or NIR light may allow for the display device 101 and display substrate 102 to support night-vision compatibility which is not detectable by enemy IR and/or NIR detectors.

For example, as shown in FIG. 4A, pixels 103 of display substrate 102 may each include one or more spectrum-altered sub-pixels 105 which do not emit IR and/or NIR light (e.g., sub-pixel 105b). During daytime operations, during which the emission of IR and/or NIR light is less of a concern, each sub-pixel 105a-105b may be in an active state. Thus, during daytime operations, the display substrate 102 may emit IR and/or NIR light for maximum image contrast and resolution.

Continuing with the same example, as shown in FIG. 4B, the sub-pixel drive 106 may be configured to generate one or more control signals configured to selectively actuate each sub-pixel 105 which emits IR and/or NIR light to an inactive state during nighttime operations (low ambient light conditions). For instance, as shown in FIG. 4B, the sub-pixel drive 106 may be configured to selectively actuate sub-pixels 105a, 105c, and 105d to an inactive state such that only spectrum-altered sub-pixel 105b is in an inactive state. By selectively actuating IR and/or NIR-producing sub-pixels 105 to an inactive state during night time operations, system 100 may be configured to provide a night-vision compatible display substrate 102 which is not detectable by IR and/or NIR detectors.

Figure 5:
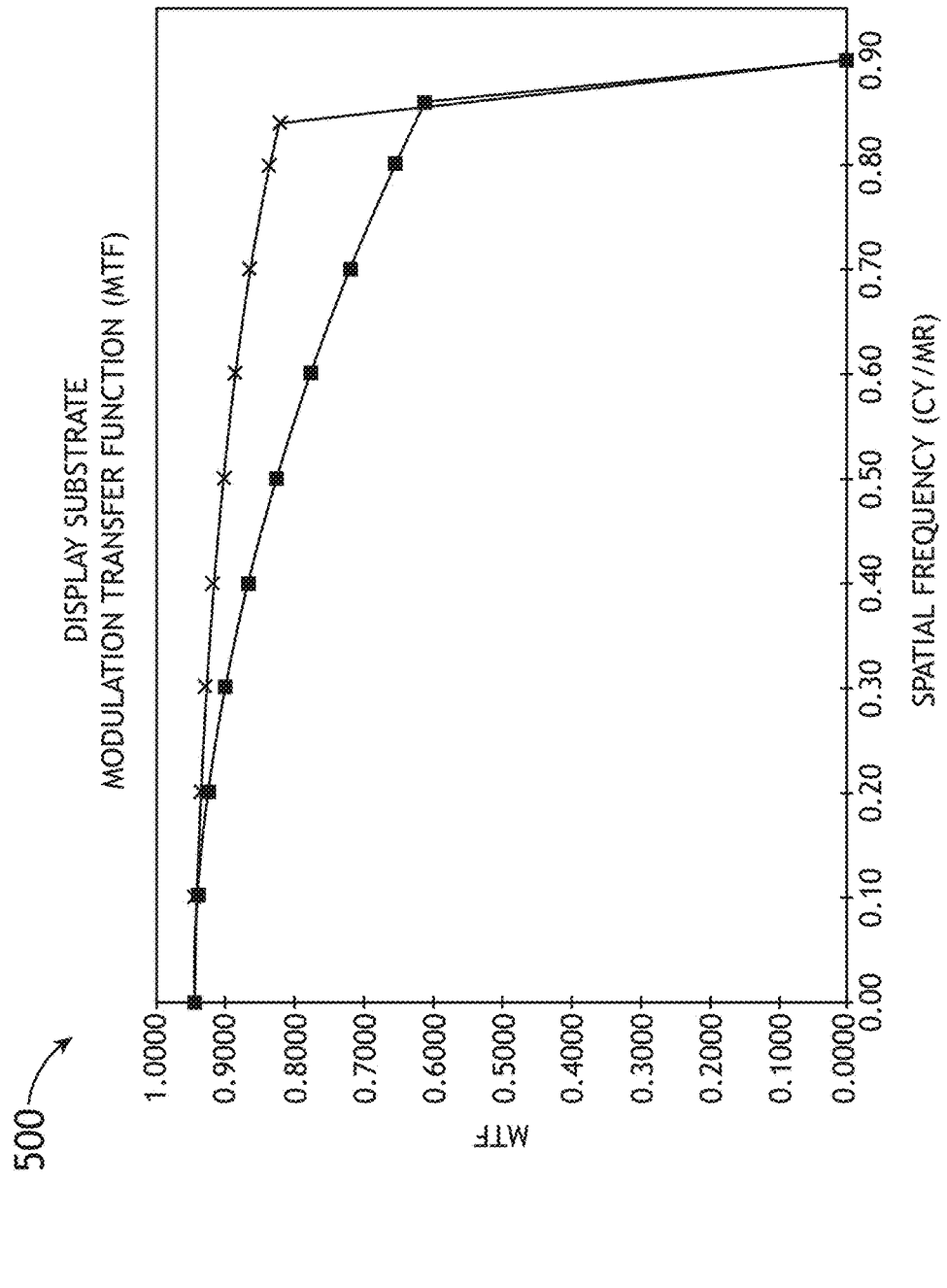
FIG. 5 illustrates a graph depicting the relationship between pixel fill factor and Modulation Transfer Function (MTF), in accordance with one or more embodiments of the present disclosure.

FIG. 5 illustrates a graph 500 depicting the relationship between pixel fill factor and Modulation Transfer Function (MTF), in accordance with one or more embodiments of the present disclosure. In particular, graph 500 illustrates that system 100 including a high fill factor display substrate 102 and sub-pixel drive 106 may be capable of providing the highest MTF (e.g., highest image quality), as compared to a display substrate 102 with a high-fill factor but without a sub-pixel drive 106.

Figure 6:
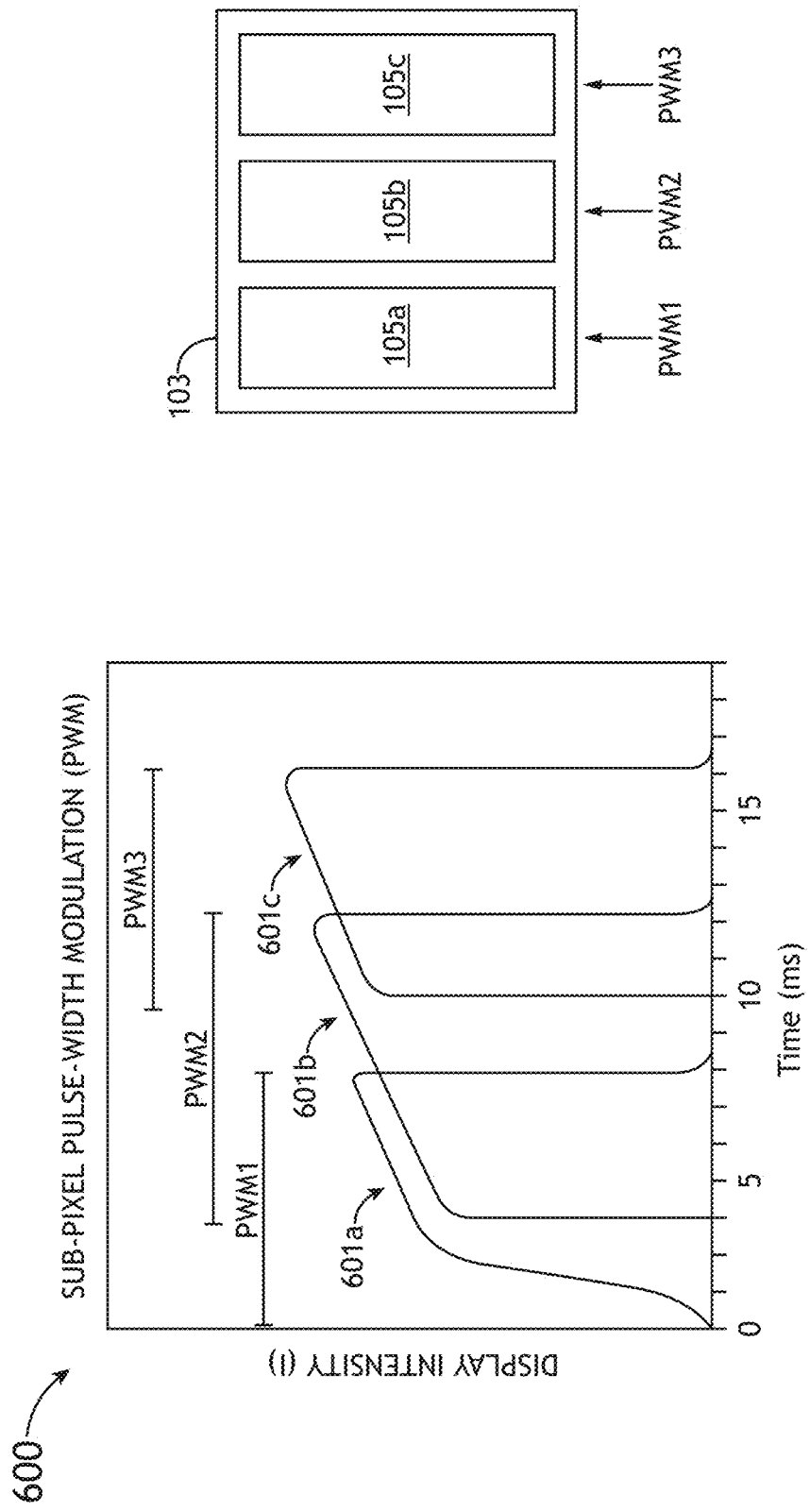
FIG. 6 illustrates a graph depicting sub-pixel Pulse Width Modulation (PWM), in accordance with one or more embodiments of the present disclosure.

FIG. 6 illustrates a graph 600 depicting sub-pixel Pulse Width Modulation (PWM), in accordance with one or more embodiments of the present disclosure. In particular, graph 600 illustrates display intensity (y-axis) (e.g., brightness level, luminance level) against time (x-axis). Display intensity (e.g., luminance level) may be regarded as a function of electric current provided to each sub-pixel, wherein increasing the current increases the brightness intensity (e.g., luminance level), and decreasing the current decreases the brightness intensity.

In embodiments, the sub-pixel drive 106 is configured to transmit control signals to sub-pixels 105 of a pixel 103, wherein the control signals provided to each respective sub-pixel 105 vary in time, duration, current, and the like. In this regard, the sub-pixel drive 106 may be configured to carry out sub-pixel PWM. In embodiments, PWM may be carried out in order to add resolution to the brightness (e.g., luminance) control of the display substrate 102.

For example, as shown in FIG. 6, a pixel 103 of a display substrate 102 may include a first sub-pixel 105a, a second sub-pixel 105b, and a third sub-pixel 105c. The sub-pixel drive 106 may be configured to transmit a first set of control signals 601a (PWM 1) to the first sub-pixel 105a, transmit a second set of control signals 601b (PWM 2) to the second sub-pixel 105b, and transmit a third set of control signals 601c (PWM 3) to the third sub-pixel 105c. In embodiments, first set of control signals 601*a* (PWM 1), second set of control signals 601*b* (PWM 2), and the third set of control signals 601*c* (PWM 3) may exhibit one or more varying characteristics. For instance, as shown in FIG. 6, each set of control signals may result in a varying display intensity profile (e.g., luminance level profile). In this regard, the sub-pixel drive 106 may be configured to provide control signals with varying electric current intensity profiles to each respective sub-pixel 105*a*-105*c* in order to operate each sub-pixel 105*a*-105*c* at varying display intensities over time (e.g., varying sub-pixel luminance levels). As the term is used herein, an electric current intensity profile of a set of control signals 601 may set and/or provide a sub-pixel 105 display intensity (e.g., luminance level) (y-axis) over time (e.g., luminance level profile). Accordingly, increasing an electric current intensity to a sub-pixel 105 may increase the sub-pixel 105 brightness intensity (e.g., luminance level). Conversely, decreasing an electric current intensity to a sub-pixel 105 may decrease the sub-pixel 105 luminance level. The time-weighted average of the sets of control signals 601*a*-601*c* (PWM 1, PWM 2, and PWM 3) across a particular timeframe may set the intensity of the total pixel 103 throughout the respective timeframe.

By way of another example, in some embodiments, the sub-pixel drive 106 may be configured to generate distinct sets of control signals 601*a*-601*c* such that each set of control signals 601*a*-601*c* is offset with respect to start time, end time, and/or duration. For instance, as shown in FIG. 6, the sub-pixel drive 106 may generate a first set of control signals 601*a* (PWM 1) which starts at time $t_{1_o}$=0 ms, a second set of control signals 601*b* (PWM 2) which starts at time $t_{2_o}$=4 ms, and a third set of control signals 601*c* (PWM 3) which starts at time $t_{3_o}$=10 ms. In this regard, the sub-pixel drive 106 may be configured to selectively modify brightness intensities (e.g., luminance levels) of each sub-pixel 105*a*-105*c* of the pixel 103 at varying times and/or durations. The sub-pixels 105*a*-105*c* may be pulsed in sequence in order to flash a frame of an image/video on display substrate 102 on a specific sub-pixel 105*a*-105*c* depending on a direction of motion within the video. This may be carried out by system 100 while maintaining the total correction brightness of the pixel 103 as a whole. It is further contemplated herein that allowing for PWM within each pixel 103 of the display substrate 102 may allow for a higher effective refresh rate of the display substrate 102, help reduce motion artifacts and blur, and improve image quality.

Figure 7:
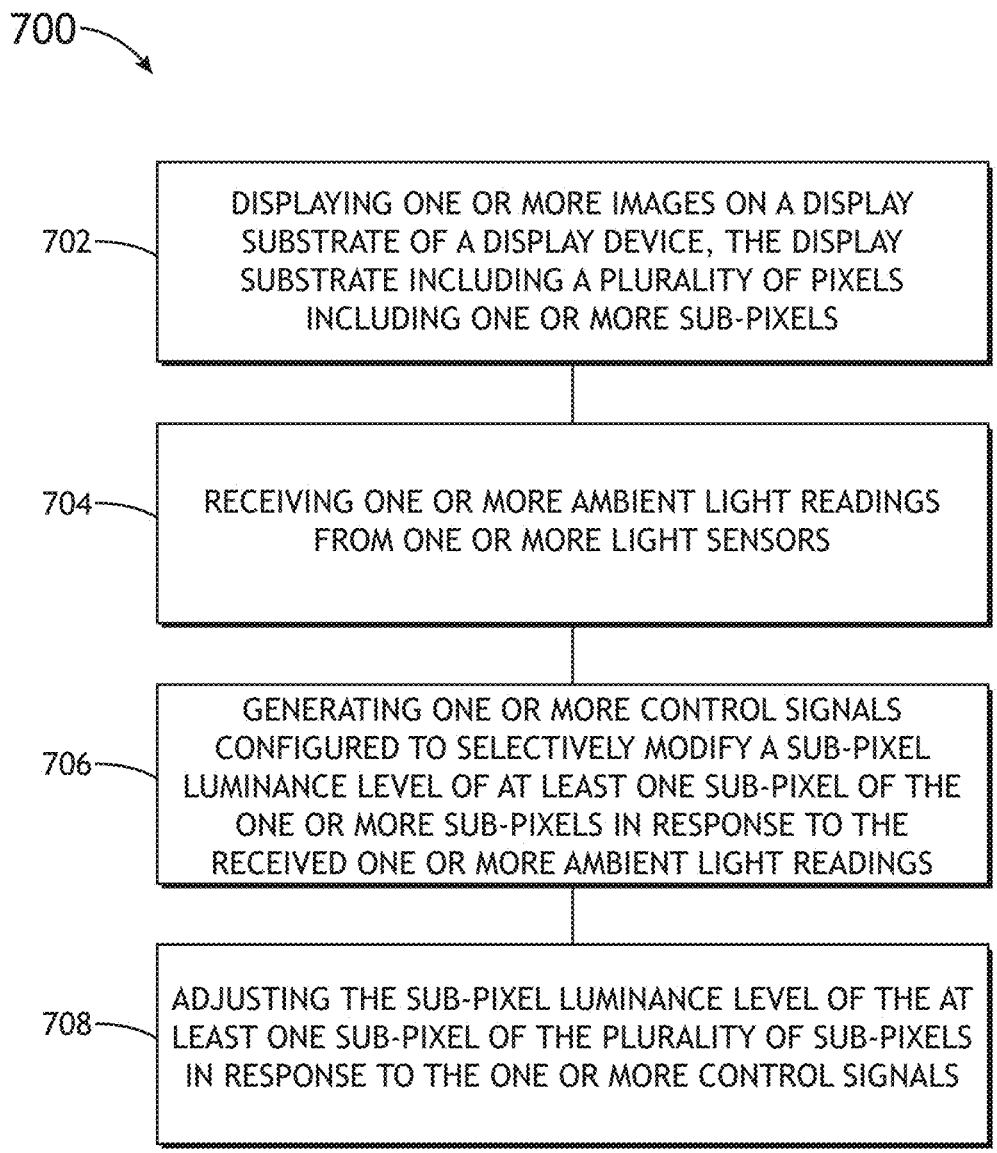
FIG. 7 illustrates a flowchart of a method for operating a display substrate with a sub-pixel drive, in accordance with one or more embodiments of the present disclosure.

FIG. 7 illustrates a flowchart of a method 700 for operating a display substrate with a sub-pixel drive, in accordance with one or more embodiments of the present disclosure. It is noted herein that the steps of method 700 may be implemented all or in part by system 100. It is further recognized, however, that the method 700 is not limited to the system 100 in that additional or alternative system-level embodiments may carry out all or part of the steps of method 700.

In a step 702, one or more images are displayed on a display substrate. For example, as shown in FIG. 1, one or more images may be displayed on a display substrate 102 of a display device 101. The display device 101 may include any display device known in the art including, but not limited to, vehicle navigation displays, aircraft navigation displays (e.g., cockpit displays), head-mounted displays (HMDs), head-up displays (HUDs), and the like. In embodiments, the display substrate 102 may include a plurality of pixels 103, wherein one or more pixels 103 include a plurality of sub-pixels 105.

In a step 704, one or more ambient light readings are received from one or more light sensors. For example, the controller 104 may receive one or more ambient light readings from the one or more light sensors 114.

In a step 706, one or more control signals are generated in response to the one or more ambient light readings, wherein the one or more control signals are configured to selectively modify a sub-pixel luminance level of at least one sub-pixel. For example, the sub-pixel drive 106 may be configured to generate one or more control signals configured to selectively actuate the at least one sub-pixel 105 from an active state to an inactive state in response to a collected ambient light reading below an ambient light threshold value. Continuing with the same example, the sub-pixel drive 106 may be further configured to and generate one or more control signals configured to selectively actuate the at least one sub-pixel 105 from an inactive state to an active state in response to a collected ambient light reading above the ambient light threshold value.

In a step 708, the sub-pixel luminance level of the at least one sub-pixel is adjusted in response to the one or more control signals. In this regard, the luminance level of each respective sub-pixel 105 of a display substrate 102 may be adjusted, thereby adjusting the overall luminance level of the display substrate 102.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system, comprising:
a display device including a display substrate configured to display at least one image, the display substrate including a plurality of pixels, wherein at least one pixel of the plurality of pixels includes a plurality of sub-pixels;
a sub-pixel drive communicatively coupled to the display substrate, the sub-pixel drive configured to:
generate one or more control signals configured to selectively modify a sub-pixel luminance level of at least one sub-pixel of the plurality of sub-pixels from a first sub-pixel luminance level to an additional sub-pixel luminance level different than the first sub-pixel luminance level,
wherein modifying the sub-pixel luminance level of the at least one sub-pixel from the first sub-pixel luminance level to a second sub-pixel luminance level lower than the first sub-pixel luminance level decreases a luminance level of the display substrate and increases a modulation transfer function (MTF) value of the display substrate, wherein modifying the sub-pixel luminance level of the at least one sub-pixel from the first sub-pixel luminance level to a third sub-pixel luminance level higher than the first sub-pixel luminance level increases the luminance level of the display substrate and decreases the modulation transfer function (MTF) value of the display substrate.

2. The system of claim 1, wherein generating one or more control signals configured to selectively modify a sub-pixel luminance level of at least one sub-pixel comprises:

generating one or more control signals configured to selectively actuate the at least one sub-pixel between an inactive state and an active state.

3. The system of claim 1, further comprising:

one or more light sensors configured to collect one or more ambient light readings, wherein the sub-pixel drive is configured to generate one or more control signals configured to selectively modify the sub-pixel luminance level of the at least one sub-pixel based on the one or more collected ambient light readings.

4. The system of claim 3, wherein generating one or more control signals configured to selectively modify a sub-pixel luminance level of at least one sub-pixel based on the one or more collected ambient light readings comprises:

generating one or more control signals configured to selectively actuate the at least one sub-pixel from an active state to an inactive state when the one or more collected ambient light readings are below an ambient light threshold value, and generating one or more control signals configured to selectively actuate the at least one sub-pixel from an inactive state to an active when the one or more ambient light readings are above the ambient light threshold value.

5. A method, comprising:

displaying one or more images on a display substrate of a display device, the display substrate including a plurality of pixels including one or more sub-pixels;

receiving one or more ambient light readings from one or more light sensors;

generating one or more control signals configured to selectively modify a sub-pixel luminance level of at least one sub-pixel of the one or more sub-pixels in response to the received one or more ambient light readings; and adjusting the sub-pixel luminance level of the at least one sub-pixel of the plurality of sub-pixels in response to the one or more control signals, wherein generating one or more control signals configured to selectively modify a sub-pixel luminance level of at least one sub-pixel of the one or more sub-pixels comprises:

generating, at a first time, a first set of one or more control signals configured to selectively modify a sub-pixel luminance level of a first sub-pixel of the one or more sub-pixels; and generating, at an additional time different from the first time, an additional set of one or more control signals configured to selectively modify a sub-pixel luminance level of an additional sub-pixel of the one or more sub-pixels.

6. A system, comprising:

a display device including a display substrate configured to display at least one image, the display substrate including a plurality of pixels, wherein at least one pixel of the plurality of pixels includes a plurality of sub-pixels;

one or more light sensors configured to collect ambient light readings; and a sub-pixel drive communicatively coupled to the display substrate, the sub-pixel drive configured to:

generate one or more control signals configured to selectively modify a sub-pixel luminance level of at least one sub-pixel of the plurality of sub-pixels between an active state and an inactive state in response to a collected ambient light reading in order to adjust one or more characteristics of the display substrate, comprising:

generating one or more control signals configured to selectively actuate the at least one sub-pixel from the active state to the inactive state in response to a collected ambient light reading below an ambient light threshold value, and generating one or more control signals configured to selectively actuate the at least one sub-pixel from the inactive state to the active state in response to a collected ambient light reading above the ambient light threshold value.

7. The system of claim 6, wherein the one or more characteristics of the display substrate comprises at least one of a display substrate luminance level or a display substrate modulation transfer function (MTF) value.

8. The system of claim 6, wherein the plurality of sub-pixels comprise one or more spectrum-altered sub-pixels.

9. The system of claim 6, wherein the at least one pixel of the plurality of pixels comprises a first sub-pixel and an additional sub-pixel.

10. The system of claim 9, wherein the first sub-pixel is configured to emit light including infrared (IR) light wavelengths, wherein the additional sub-pixel is configured to emit light which does not include infrared (IR) wavelengths.

11. The system of claim 9, wherein the sub-pixel drive is further configured to:

generate a first set of one or more control signals configured to selectively modify a sub-pixel luminance level of the first sub-pixel; and generate an additional set of one or more control signals configured to selectively modify a sub-pixel luminance level of the additional sub-pixel.

12. The system of claim 11, wherein the first set of one or more control signals is transmitted over a first time interval and the additional set of one or more control signals is transmitted over an additional timer interval, wherein the additional time interval is different from the first time interval.

13. The system of claim 11, wherein the first set of one or more control signals includes a first electric current intensity profile, and the additional set of one or more control signals includes an additional electric current intensity profile, wherein the first electric current intensity profile is different from the additional electric current intensity profile.

14. The system of claim 6, wherein the display device comprises at least one of a head-up display (HUD), a head-mounted display (HMD), or an aircraft cockpit display.

* * * * *